US007317973B2

(12) United States Patent
Dieterle

(10) Patent No.: US 7,317,973 B2

(45) Date of Patent: Jan. 8, 2008

(54) AUTOMATIC VEHICLE GUIDANCE METHOD AND SYSTEM

(75) Inventor: Werner Dieterle, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/469,895

(22) PCT Filed: Oct. 9, 2002

(86) PCT No.: PCT/DE02/03806

§ 371 (c)(1), (2), (4) Date: Feb. 6, 2004

(65) Prior Publication Data

US 2004/0158366 A1 Aug. 12, 2004

(30) Foreign Application Priority Data

Mar. 9, 2002 (DE) ................................ 102 10 546

(51) Int. Cl.
*G08G 1/09* (2006.01)
*B60K 31/00* (2006.01)
*G06F 17/00* (2006.01)

(52) U.S. Cl. ............................. 701/23; 701/2; 701/96; 701/301; 701/41; 180/167

(58) Field of Classification Search ............ 701/23–26, 701/28, 41, 117–119, 200–202, 207–210, 701/213, 2, 93, 96; 180/167–169, 401
See application file for complete search history.

(56) References Cited

U.S. PATENT DOCUMENTS 5,483,453 A * 1/1996 Uemura et al. ............... 701/23
5,504,482 A * 4/1996 Schreder ................ 340/995.13
5,938,707 A * 8/1999 Uehara ........................ 701/41
6,032,098 A * 2/2000 Takahashi et al. .......... 701/210
6,061,628 A * 5/2000 Hayashi et al. ............. 701/208
6,343,247 B2 * 1/2002 Jitsukata et al. .............. 701/28
6,347,278 B2 2/2002 Ito
6,622,079 B2 * 9/2003 Minowa et al. ............... 701/96

FOREIGN PATENT DOCUMENTS

DE 199 55 237 A 5/2001

(Continued)

OTHER PUBLICATIONS

"Adaptive Cruise Control" in Automotive Electronics Handbook, Ronald K. Jurgen (editor), 2nd edition, McGraw-Hill (1999), chapter 30.1.

(Continued)

*Primary Examiner*—Tan Q. Nguyen
(74) *Attorney, Agent, or Firm*—Kenyon & Kenyon LLP

(57) ABSTRACT

A method for automatic vehicle guidance is provided, in which infrastructure data is wirelessly transmitted to the vehicle and vehicle guidance commands are calculated on the basis of the infrastructure data. In this method, the infrastructure data for at least a section of the travel route immediately ahead is loaded into an on-board memory, the current position of the vehicle is continuously determined using a precise position system, and the commands are calculated on the basis of the position data and the stored infrastructure data.

10 Claims, 1 Drawing Sheet

22 40 42 20 12 10 38 28 30 36 16 26 14 34 32 24 44 18

FOREIGN PATENT DOCUMENTS

| | | | |
|---|---|---|---|
| DE | 100 10 436 | A | 9/2001 |
| EP | 1 035 531 | A | 9/2000 |
| JP | 9128686 | | 5/1997 |
| JP | 2001126197 | | 10/2000 |
| JP | 2003319193 | | 11/2003 |
| WO | WO 00 05091 | A | 2/2000 |

OTHER PUBLICATIONS

R. Kasper/A. Kaiser: “Automatisches koordiniertes Fahren im Rechnerexperiment und Laborversuch” “Automatic Coordinated Driving in the Computer Experiment and Laboratory Testing”), 3rd Mechatronics Workshop, University of Applied Sciences of Brandenburg.

* cited by examiner

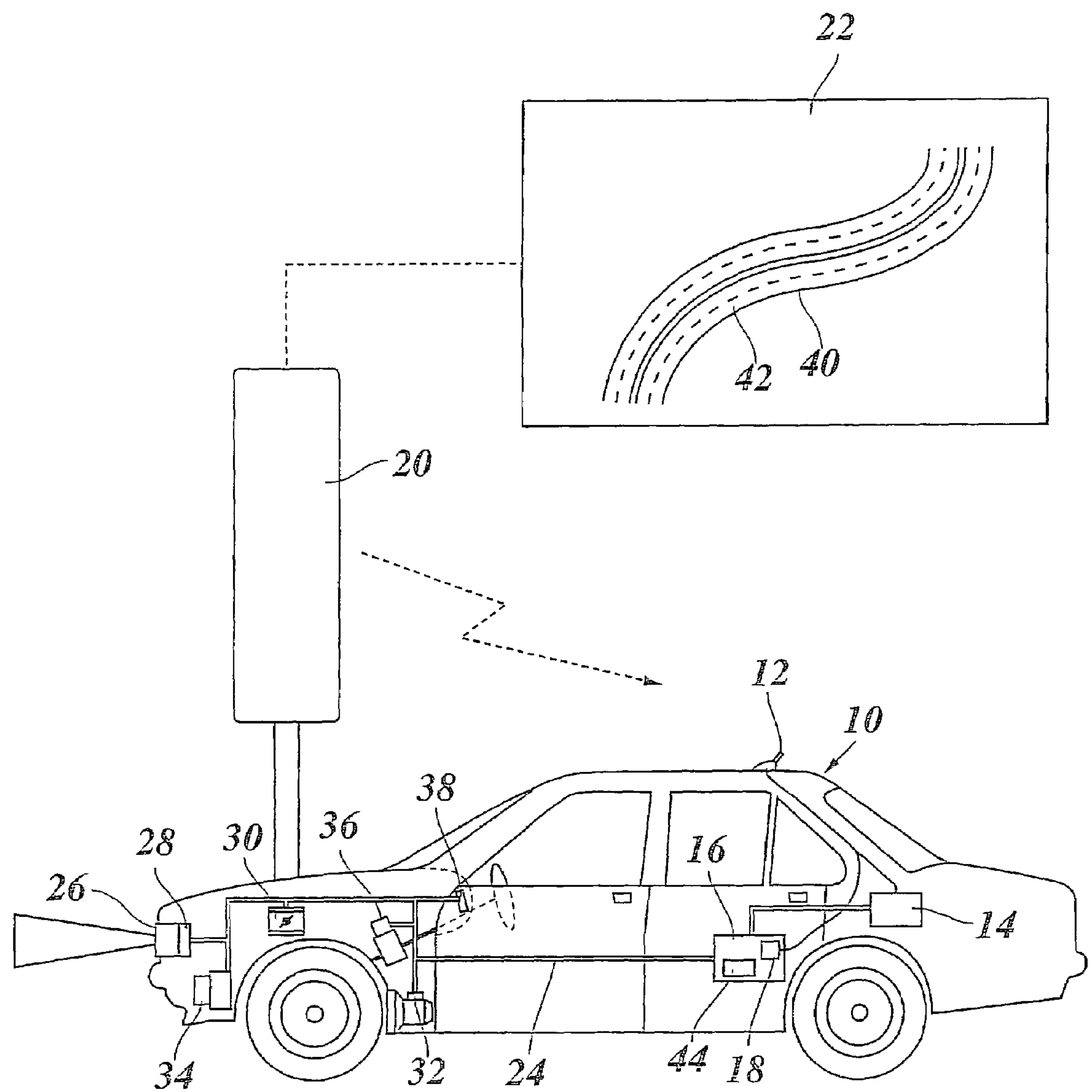
22
20
42
40
12
10
38
28
30
36
16
26
14
34
32
24
44
18

AUTOMATIC VEHICLE GUIDANCE METHOD AND SYSTEM

BACKGROUND INFORMATION

The present invention relates to a method for automatic vehicle guidance, in which infrastructure data is wirelessly transmitted to the vehicle and vehicle guidance commands are calculated on the basis of the infrastructure data, and to a system for carrying out this method.

BACKGROUND INFORMATION

For motor vehicles, speed control systems are known which allow the speed of the vehicle to be controlled to a desired speed selected by the driver. Moreover, it is possible to measure the distance from a vehicle ahead using a distance sensor, for example, using as a radar or lidar sensor. Then, the speed control is modified in such a manner that a predetermined, e.g., speed-dependent distance from the vehicle ahead that is selected as the target object is maintained. Such systems, which are also referred to as adaptive speed control systems or ACC (adaptive cruise control) systems, allow automatic longitudinal vehicle guidance under suitable conditions by intervention in the drive and brake systems. If the intention is to also implement automatic lateral guidance of the vehicle by intervention in the steering, for example, automatic lane keeping, additional data about the traffic infrastructure is required, e.g., data about the course and width of the lane.

In order to make such infrastructure data available in the vehicle, camera-aided systems have been proposed which allow the course of the roadway or lane boundaries to be detected by electronic image processing. To this end, sufficiently clear markings on the roadway or at the edge of the roadway are needed. The operational reliability of such systems could be improved by affixing additional markings in the form of reflectors to the roadway, to the guardrails, etc, in addition to the road markings that already exist today.

In www.path.berkeley.edu/PATH/Research/magnets (September 2001) and in R. Kasper/A. Kaiser: "Automatisches koordiniertes Fahren im Rechnerexperiment und Laborversuch" ("Automatic Coordinated Driving in the Computer Experiment and Laboratory Testing"), 3rd Mechatronics Workshop, University of Applied Sciences of Brandenburg, methods have been proposed which work with magnetic markers that are detected by a magnetic sensor mounted on the vehicle. The magnetic markers are, for example, embedded in the roadway pavement at the center of the lane at intervals of about one meter. Using different polarities of the makers, it is also possible, within certain limits, to wirelessly transmit digital information to the vehicle, for example, to indicate curves. However, installation of the magnetic markers in the roadway requires very great installation effort, and the information content conveyed by the markers can be changed later only with very great effort.

The object of the present invention is to provide a method for automatic vehicle guidance that can be implemented with little installation effort and adapted to changed conditions in a flexible manner.

SUMMARY OF THE INVENTION

In a method according to the present invention, this objective is achieved by providing that the infrastructure data for at least a section of the travel route immediately ahead is loaded into an on-board memory, as well as providing that the current position of the vehicle is continuously determined using a precise position system, and providing that the commands are calculated on the basis of the position data and the stored infrastructure data.

In this method, the infrastructure data may represent a virtual infrastructure that indicates the course of the roadway or lane in a global coordinate system. Using the position system, the current position of the vehicle is determined in the same coordinate system so that the position of the vehicle can be correlated with the infrastructure data. On this basis, it is then possible to calculate setpoint values for the different control loops of the automatic vehicle guidance system and to use them as a basis for the control. For example, the infrastructure data can contain information about the geometry of the course of the road and information regarding the number and widths of the individual lanes so that setpoints which correspond to the center of the particular lane on which the vehicle is traveling can be made available to the automatic lateral guidance of the vehicle. Since the course of the roadway indicated by the infrastructure data also allows determination of the curve radii, it is also possible to derive setpoint values or limit values for the traveling speed which are adapted to the shape of the curve and which complement the longitudinal vehicle guidance within the framework of a conventional ACC system.

One advantage of the present invention is that the infrastructure data can be adapted to changed conditions with very small effort and in an extremely flexible manner. Thus, for example, relocation of lanes or lane constrictions at construction sites can be accommodated by simply changing the infrastructure data. In this manner, traffic safety can be considerably increased especially in the area of construction sites by fully automatic lateral guidance or by a lane-keeping assistance system which only aids the driver.

The method according to the present invention allows a variety of enhancements. For example, the infrastructure data can also contain information about the uphill grade or downhill grade of the roadway, which enables improved longitudinal guidance. Moreover, the infrastructure data can also act as virtual traffic signs by containing information about road-related restrictions such as speed limits, prohibited passing, or the like, or warnings of particular danger spots. The automatic vehicle guidance system can either directly apply this information, for example, by automatically reducing the setpoint speed in the case of speed limits or warnings of danger, by automatically blocking an automatic passing algorithm, if implemented in the vehicle, in the case of prohibited passing (such as for trucks on expressways), or the like, or the information can be communicated to the driver by synthetic speech output.

The infrastructure data may be provided by a central server, or by decentralized servers distributed over the road network, and is loaded into the memory of the vehicle via a radio link before the automatic vehicle guidance is started. The radio link can be, for example, a mobile radio link such as GSM or UMTS, or a broadcast link such as DAB, DMB, and the like. Then, the data that is relevant for determining the currently valid setpoint values is selected from the stored infrastructure data on the basis of the position data provided by the position system. At the same time, the position data provides the actual values for lateral guidance, i.e., for example, the current deviation of the vehicle from the center of the lane. Then, by setpoint/actual value comparison, it is possible to either directly generate a corresponding control command for the steering system, or to issue a warning to the driver, informing him/her of the necessity of a steering intervention.

For a sufficiently accurate setpoint/actual value comparison, the position system may need to have a resolution on the order of several decimeters or better, which is not yet attainable by the conventional GPS system. However, position systems that are capable of achieving the required resolution, such as DGPS or GALILEO, are being planned or already under construction. In general, the position system can be a satellite-based system or, optionally, also a system based on terrestrial radio stations, such as mobile radio base station.

The present invention is advantageous in combination with a navigation system. In this case, the precise position system required for the method according to the present invention can also be used by the navigation system. Conversely, the audible and graphical output devices of the navigation system can be used by the vehicle guidance system. Moreover, the precalculation of the travel route by the navigation system offers the possibility of selectively downloading the infrastructure data for this travel route or for the next section of this travel route.

If no navigation system is present, or in the case that the driver does not use the navigation system because he/she knows the route, provision may be made for a mode in which the infrastructure data for the current surroundings of the vehicle is automatically loaded into the on-board memory. The selection of these surroundings may be dependent on the direction of travel and includes, for example, the data for the currently traveled road up to the next possible turn as well as the data for the initial sections of all roads that can be traveled from this possible turn. When the vehicle reaches the next possible turn and the driver decides on one of the possible routes, then there is still enough time to download the infrastructure data for the next vehicle surroundings. Thus, it can be ensured that the required infrastructure data is provided in its entirety even if the destination is unknown to the system.

In the case that it is not possible to establish a radio link to the server in time to download the required infrastructure data, provision may be made for appropriate precautions, for example, automatic initiation of an emergency stop of the vehicle or automatic deactivation of the vehicle guidance system in conjunction with a request to the driver to take over.

For the loading of the required information into the on-board memory, it is also possible to have a mixed mode in which the essential information that is absolutely necessary for vehicle guidance is loaded for the whole route or for a longer section of the route, while less important supplementary information, such as uphill or downhill grade, traffic jam warnings, detour recommendations, or the like, are loaded only if required or when the opportunity arises. In this case, the choice of less essential information can be considerably extended without the risk of overloading the radio network, for example, to include information about services such as gas stations, parking areas and the like, tourist information or also information about commercial offers, which provides the possibility of financing the system, at least partially, by advertisements. In this context, it is also possible to weight the information by priority so that the essential information is transmitted with priority, while supplementary information is transmitted only if the transmission capacity of the radio network allows for this.

In one embodiment of the present invention, it is also possible to provide special radio beacons for the radio link between the vehicle and the server, the radio beacons being installed at larger intervals on the road network. This, in fact, creates a somewhat greater installation effort than when using a public mobile radio network; however, this approach provides a larger transmission capacity and makes it easier to supplement the infrastructure data by more location-specific information.

For example, it is possible to automatically acquire information about the current road condition (wetness, black ice), and to transmit it via the radio beacon for the respective section of the route. Thus, for example, a speed limit which applies only in wet conditions could also be implemented automatically. In principle, however, this is also possible if the infrastructure data is dynamically updated in a central server.

Moreover, the radio links and servers required for the method according to the present invention may be also used within the framework of a traffic guidance system. Similarly, the radio link can also be used to transmit information, such as traffic jam warnings, ice warnings, or accident reports from the vehicle to the server, together with the location information that is available in the system anyway, so that calls for help, warnings to other traffic participants, and the like, could be passed on within the shortest possible time.

BRIEF DESCRIPTION OF THE DRAWING

FIGURE shows a block diagram of the components of a system for carrying out the method according to the present invention.

DETAILED DESCRIPTION

As shown in the FIGURE, motor vehicle 10 has an antenna 12, a position system 14, such as a DGPS receiver, and a guidance unit 16 constituted by a microcomputer or another electronic data processing system. Antenna 12 can be a multi-purpose antenna which, on one hand, is connected to position system 14 and, on the other hand, to a mobile radio interface 18 of guidance unit 16. Via antenna 12, position system 14 receives satellite signals for high-precision satellite navigation with a spatial resolution of at least several decimeters. Via mobile radio interface 18 and antenna 12 and a mobile radio network 20, here symbolized by a radio beacon, the guidance unit communicates with a server 22 in which is stored traffic infrastructure data about the road network at least for the region in which vehicle 10 is located.

Moreover, guidance unit 16 is connected to position system 14 and to further system components of vehicle 10 via a data bus (such as a CAN bus). In the example shown, these system components include a radar sensor 26 that includes an ACC control unit 28 and is mounted at the front end of the motor vehicle, an electronic drive control unit 30, a transmission control unit 32, a brake system control unit 34, a steering control unit 36, as well as an operating control unit 38.

Using multi-beam radar, radar sensor 26 measures the distances, relative speeds and azimuth angles of objects that are located ahead of the vehicle and reflect the radar waves. The raw data, which is received at regular intervals, for example, every 10 ms, is evaluated in ACC control unit 28 to identify and track individual objects and, in particular, to recognize a vehicle immediately ahead on the same lane, and to select it as a target object. ACC control unit 28 controls the speed of vehicle 10 through commands to drive control unit 30 and brake system control unit 34 and, in the case of vehicles having automatic transmission, to transmission control unit 32. Operating control unit 38 contains different operating control and indicating elements on the dashboard of the vehicle and is used, inter alia, to transmit operating commands of the driver to ACC control unit 28 or guidance unit 16, and to output messages of these units to the driver. For this purpose, the operating control unit can also include a loudspeaker output for audible signals or synthetic speech. Preferably, operating control unit 38 also includes a navigation system which accesses the position signals delivered by position system 14.

If no vehicle is detected ahead, ACC control unit 28 controls the speed of vehicle 10 to a desired speed selected by the driver. However, if a vehicle ahead whose speed is smaller than that of one's own vehicle is detected as a target object, then the speed of vehicle 10 is controlled in such a manner that an appropriate distance from the vehicle ahead is maintained.

The design and mode of operation of such an ACC system are described, for example, in Winner, "Adaptive Cruise Control" in *Automotive Electronics Handbook*, Ronald K. Jurgen (editor), 2nd edition, McGraw-Hill (1999), chapter 30.1.

The ACC system described above can be operated as an autonomous system and, in this case, is directly controlled by the driver via operating control unit 38. However, in the example described here, the ACC system at the same time constitutes a subsystem in the framework of an automatic vehicle guidance which is controlled by guidance unit 16. When this automatic vehicle guidance is active, the longitudinal vehicle guidance, i.e., speed control, is taken over by guidance unit 16.

Then, guidance unit 16 also provides automatic lateral guidance of the vehicle by intervention in the steering system.

When activating the automatic vehicle guidance, initially the current vehicle position is determined using position system 14. Via mobile radio interface 18, guidance unit 16 contacts server 22 to retrieve infrastructure data about the route ahead of the vehicle from the server. As symbolically shown in the drawing, this infrastructure data includes, e.g., the course of roadway 40 on which the vehicle is traveling, and the number of lanes 42 of this roadway in the respective direction of travel, as well as the width of these lanes. It is further possible for the infrastructure data to include the uphill or downhill grade of the roadway, speed limits, and other information which can be additionally used for the vehicle guidance and/or which are to be made available to the driver of vehicle 10. This data is loaded into an internal memory 44 of guidance unit 16 via the mobile radio network.

As soon as the loading operation is completed, guidance unit 16 can start the automatic guidance operation. Within the framework of this guidance operation, guidance unit 16 determines the roadway curvature based on the data about the course of the roadway now stored in memory 44 and, if necessary, intervenes in the speed control to avoid traveling through a curve at excessive speed. The intervention can be accomplished, for example, in that the speed value that is output by ACC control unit 28 as the setpoint speed is limited to a value determined by guidance unit 16. A corresponding intervention is also carried out if it follows from the infrastructure data that the route traveled is subject to a speed limit. Unless the infrastructure data requires a reduction in traveling speed, guidance unit 16 passes control on to ACC control unit 28 so that the speed is again controlled to the desired speed selected by the driver or to the distance from the vehicle ahead.

If the infrastructure data includes information about the uphill or downhill grade of the roadway, this information is passed on to ACC control unit 28 or directly to drive control unit 30 and brake control unit 34, allowing the roadway grade to be appropriately taken into account in the intervention in the drive or brake systems.

In the framework of the lateral vehicle guidance, the deviation of the current vehicle position from the center of the traveled lane is determined by guidance unit 16 on the basis of the position data provided by position system 14 and on the basis of the infrastructure data stored in memory 44. If this deviation is outside of certain tolerance limits, guidance unit 16 initiates an intervention in the steering system via steering control unit 36 so that the vehicle is kept at the center of the lane.

The relevant tolerance limits can, in turn, be dynamically adapted to the specific lane width that follows from the infrastructure data. Thus, for example, in the case of a lane constriction in the area of a construction site, narrower tolerance limits will be selected accordingly. Since the infrastructure data is loaded into memory 44 only at or after the start of travel, it is always up-to-date so that it reflects the current conditions in the area of the construction site provided that the data stored in server 22 is kept up-to-date by the competent authorities.

If no current data is available in the server, for example, during the setting up of a new construction site, then the infrastructure data contains corresponding information, and the lateral guidance system is switched off in time before entering the construction site. At the same time, the driver is requested to take over the lateral guidance of the vehicle himself/herself.

If the tolerance limits allow a certain deviation from the center of the lane, it is also possible for guidance unit 16 to calculate, on the basis of the course of the roadway, an "ideal line" that is optimized with respect to vehicle dynamics, increasing comfort by controlling to this ideal line instead of the center of the lane.

When approaching a slower vehicle ahead, ACC control unit 28 normally causes a deceleration of vehicle 10. However, long before this deceleration begins, it is optionally possible to issue a request to the driver via operating control unit 38 as to whether he/she wishes to perform a passing maneuver. When the driver has made sure that the adjacent lane is free and enters a passing command, guidance unit 16 can then initiate an automatic lane change by taking the center of the adjacent lane as the new setpoint value for the lateral guidance.

The position data acquired by position system 14 with high accuracy can be used not only for lateral vehicle guidance, but also in the framework of longitudinal guidance. For example, it is possible to monitor the speedometer of the vehicle and to retrieve it later, if required, using the position data.

The system described can be enhanced in many ways. For example, the communication between guidance unit 16 and server 22 via mobile radio network 20 can also be used for other purposes, for example, for traffic jam warnings to the server, which can easily be generated by the driver by pressing a key, or, in the case of toll roads, for automatic toll billing. When adding further system components, such as rear radar or all-around radar, the automatic vehicle guidance can also be enhanced to include automatic initiation of passing maneuvers or other lane changes. If an obstacle detection system is present, which, for example, is based on a video camera and allows detection of persons on the roadway or at edge of the roadway, it is also conceivable to extend the automatic vehicle guidance to city traffic. If infrastructure data is also detected using a camera and image-processing system, this data can be combined with the data loaded into memory 44, allowing the image-processing procedures to be simplified and speeded up, and increasing the functional reliability. By continuously updating the infrastructure data stored in memory 44, it is also possible to determine time-variant parameters such as traffic light states, and the like, enabling automatic adaptation of the speed to a "green wave" or, if the ACC system has a stop-and-go function, automatic stopping at a red traffic light. Also possible are automatic speed reduction and a warning to the driver when approaching an intersection or junction on non-priority roads.

It should be noted that the present invention is not limited to applications within the framework of automatic vehicle guidance in the actual sense, but is also useful in cases where the longitudinal and, in particular, the lateral guidance of the vehicle remains with the driver, wherein the present invention provides supporting information to the driver.

What is claimed is:

1. A method for automatic guidance of a vehicle having a steering control unit, comprising:

receiving at the vehicle wirelessly transmitted infrastructure data for a travel route;

storing in an on-board memory of the vehicle infrastructure data for at least a current section of the travel route immediately ahead of the vehicle;

continually determining a current position of the vehicle using a position-determining system; and calculating vehicle-guidance commands at least on the basis of continually determined current position data and the stored infrastructure data, whereby the vehicle-guidance commands influence the steering control unit to maintain the vehicle at the center of a road lane, wherein the wireless transmitted infrastructure data includes information about a current road condition that is automatically acquired and transmitted via a radio beacon for a respective section of the travel route, wherein the wirelessly transmitted infrastructure data includes data regarding a course of a roadway, a number of lanes of the roadway and a width of the lanes, and wherein the method further includes:

recording a vehicle preceding the vehicle and slower than the vehicle as a target object, and regulating a speed of the vehicle to maintain a clearance from the slower vehicle, the regulation of the speed being taken over by an electronic guidance unit when an automatic vehicle guidance is active.

2. The method as recited in claim 1, wherein the infrastructure data for the travel route is transmitted from a server via a radio network.

3. The method as recited in claim 1, wherein the infrastructure data for the entirety of the travel route is store in the on-board memory at the start of travel on the travel route.

4. The method as recited in claim 1, wherein only the infrastructure data for the current section of the travel route immediately ahead of the vehicle is stored in the on-board memory at any one time, and wherein the infrastructure data for a next section of the travel route is automatically loaded into the on-board memory as soon as the vehicle reaches the end of the current section of the travel route.

5. The method as recited in claim 1, wherein the infrastructure data for the travel route includes at least one of data regarding road-related restrictions and warnings of danger spots.

6. The method as recited in claim 1, wherein the stored infrastructure data for at least the current section of the travel route includes data regarding one of uphill and downhill grade of a road.

7. The method of claim 1, wherein the current road condition includes at least one of information regarding wetness and black ice.

8. A system for performing automatic guidance of a vehicle with the aid of a position-determining system, the vehicle having a steering control unit, a drive control unit and a brake control unit, comprising:

an electronic guidance unit for the vehicle, wherein the electronic guidance unit communicates with the position-determining system for determining a position of the vehicle, and wherein the electronic guidance unit receives, via a radio network, infrastructure data regarding a travel route for the vehicle; and a memory for storing infrastructure data for at least a current section of the travel route immediately ahead of the vehicle;

wherein the electronic guidance unit calculates control commands for at least the drive control unit and the steering control unit on the basis of position data for the vehicle and the stored infrastructure data for at least the current section of the travel route immediately ahead of the vehicle, whereby the steering control unit maintains the vehicle at the center of a road lane, wherein the wirelessly transmitted infrastructure data includes information about a current road condition that is automatically acquired and transmitted via a radio beacon for a respective section of the travel route, wherein the wirelessly transmitted infrastructure data includes data regarding a course of a roadway, a number of lanes of the roadway and a width of the lanes; and wherein the system further includes an adaptive cruise control (ACC) arrangement having a radar sensor to record a vehicle preceding the vehicle and slower than the vehicle as a target object and an adaptive cruise control (ACC) control unit to regulate the speed of the vehicle so that a clearance from the preceding vehicle is maintained, the regulation of the speed of the vehicle being taken over by the electronic guidance unit when an automatic vehicle guidance is active.

9. The system as recited in claim 8, wherein the electronic guidance unit includes a navigation system that receives the position data from the position-determining system.

10. The system as recited in claim 8, wherein the stored infrastructure data is fed to the drive control unit and the brake control unit to influence the drive control unit and the brake control unit.

* * * * *